(12) United States Patent
Rez

(10) Patent No.: US 7,810,322 B2
(45) Date of Patent: Oct. 12, 2010

(54) TURBO-TRANSMISSION

(76) Inventor: Mustafa Rez, 19512 E. Dexter St., Covina, CA (US) 91724

( * ) Notice: Subject to any disclaimer, the term of this patent is extended or adjusted under 35 U.S.C. 154(b) by 351 days.

(21) Appl. No.: 12/145,469

(22) Filed: Jun. 24, 2008

(65) Prior Publication Data
US 2009/0313983 A1 Dec. 24, 2009

(51) Int. Cl.
*F16D 33/00* (2006.01)
(52) U.S. Cl. .............................. 60/348; 60/424; 415/61
(58) Field of Classification Search .............. 60/335, 60/348, 424; 415/61, 123
See application file for complete search history.

(56) References Cited
U.S. PATENT DOCUMENTS

| | | | |
|---|---|---|---|
| 1,688,968 A | * | 10/1928 | Huwiler .................. 60/348 |
| 2,168,862 A | | 8/1939 | Sensaud De Lavaud |
| 2,374,588 A | * | 4/1945 | Doran .................. 60/425 |
| 2,380,734 A | | 7/1945 | Eastin |
| 2,469,085 A | | 5/1949 | Sheppard |
| 2,671,543 A | | 3/1954 | Bosch |
| 2,812,670 A | | 11/1957 | Winther |
| 2,890,600 A | | 6/1959 | Smirl et al. |
| 3,250,149 A | | 5/1966 | Jandasek |
| 3,528,321 A | | 9/1970 | Harmon et al. |
| 3,557,635 A | | 1/1971 | Tuck |
| 4,100,823 A | | 7/1978 | Krist |
| 4,391,096 A | | 7/1983 | Polzer et al. |
| 4,624,110 A | | 11/1986 | Levites |
| 4,969,332 A | | 11/1990 | Nancarrow et al. |
| 5,088,357 A | | 2/1992 | Kamada et al. |
| 6,378,287 B2 | | 4/2002 | Griffiths |
| 6,711,896 B1 | | 3/2004 | Johnson |
| 6,877,593 B2 | | 4/2005 | Johnson |

\* cited by examiner

*Primary Examiner*—F. Daniel Lopez
(74) *Attorney, Agent, or Firm*—Kirk A. Buhler; Buhler & Associates

(57) ABSTRACT

Improvements in a turbo transmission are provided for transferring power from a power source to a work unit. The transmission includes an input shaft coupled to a power source and to a pump that is configured to rotate with the input shaft. The pump transfers energy received from the power source into a fluid or gas. The transmission includes an output shaft and a multi-stage turbine in line. The first turbine is fixed to output shaft, and a plurality of additional turbines are fixed on either one-way overrunning clutches or multi-disc clutches and these clutches are fixed to the output shaft and after each turbine is a multi-valves that discharges the fluid or gas. After all of the multi-stage turbines a planetary gear set connects the turbo transmission to the vehicle or work unit.

18 Claims, 11 Drawing Sheets

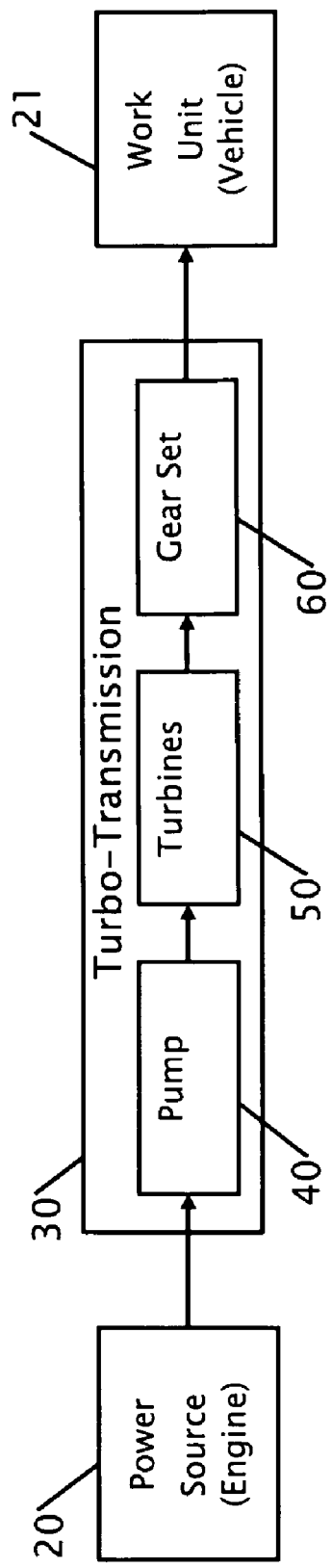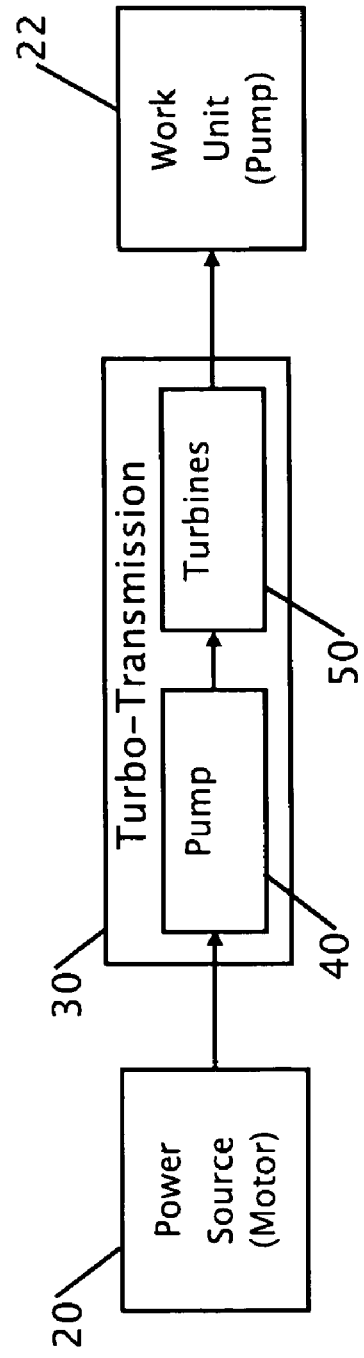
FIG. 1
FIG. 2

74 — System Curve for Pump at different rotational speeds
75 --- System Curve for Turbines T: Indicates Turbine number

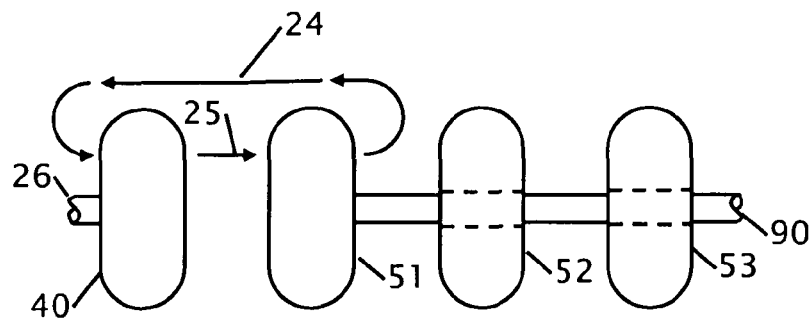
FIG. 4A
3rd Gear
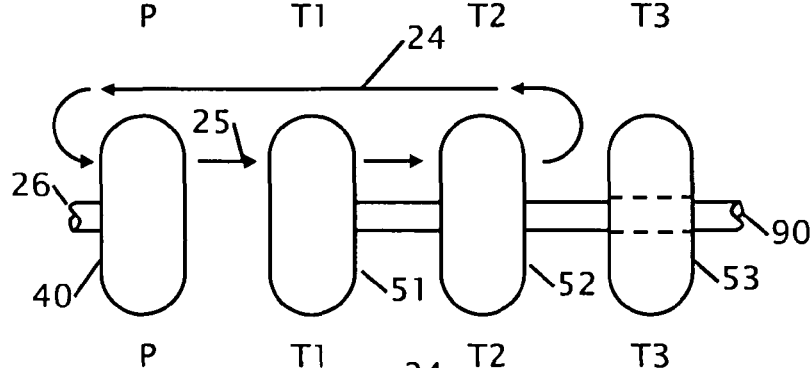
FIG. 4B
2rd Gear
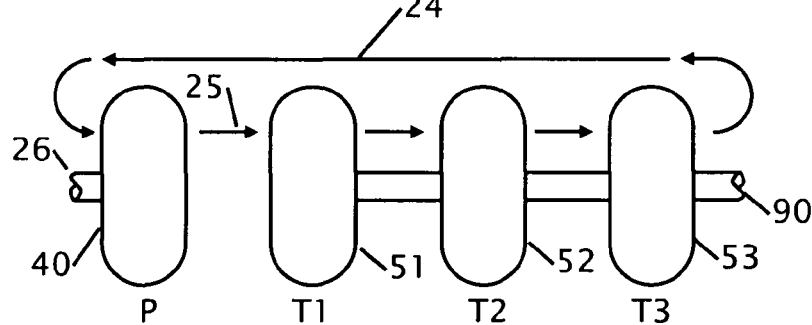
FIG. 4C
1rd Gear
|  | Turbine 1 | Turbine 2 | Turbine 3 | Solenoid1 | Solenoid2 | Solenoid3 |
|---|---|---|---|---|---|---|
| 3rd Gear | ON | OFF | OFF | OFF | ON | ON |
| 2nd Gear | ON | ON | OFF | ON | OFF | ON |
| 1st Gear | ON | ON | ON | ON | ON | OFF |
FIG. 4D

74 — System Curve for Pump at different rotational speeds
75 --- System Curve for Turbines T: Indicates Turbine number

TURBO-TRANSMISSION

CROSS REFERENCE TO RELATED APPLICATION

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

DESCRIPTION

1. Field of the Invention

This invention relates to improvements power transmission between a motor to a vehicle. More particularly, the present turbo transmission includes an input shaft coupled to a power source and to a pump that is configured to rotate with the input shaft. The hydraulic pump transfers energy received from the power source into a fluid or gas. The transmission includes an output shaft and a multi-stage turbine in line with each other. The first turbine is fixed to output shaft, the rest of the turbines are fixed on either one-way overrunning clutches or multi-disc clutches and these clutches are fixed to an output shaft and after each turbine that has multi-valves to discharge the fluid or gas. After the multi-stage turbines a planetary gear set to redirect the operation of the vehicle from forward drive (D) or to neutral (N) or to reverse drive (R).

2. Background of the Invention

Most automatic transmissions being used today normally have high fuel consumption because of the weight of the transmission, complicated system and does not meet economical driving conditions. Most manual transmission and automatic transmission are mechanical in nature and a portion of the time the speed and torque of the transmission does not match the speed and torque that is required by a vehicle or by other means. The transmission must match the speed of the vehicle but produces more or less torque that is required by the vehicle therefore there are some energy loss.

Turbo-transmission is hydraulic transmission and is continuously variable transmissions therefore the speed and torque will match the speed and torque is required by the vehicle therefore less energy loss.

Modern automatic transmissions use four or more multiple-disc clutches where the clutch plate has rough frictional material on their faces. When the multiple-disc clutches are not applied the disc will run with engine or with transmission output therefore each disc acts as disc pump and will consume energy and produce heat in the transmission. Modern automatic transmission and manual transmissions use more than eight gears when the gears run with and without engagement with the output shaft or input shaft will act as a pump because of the teeth of the gear therefore they consume energy and produce heat in the transmission. Exemplary examples or turbo transmission units are provided herein.

U.S. Pat. No. 2,890,600 issued Jun. 16, 1959 to R. L. Smirl et al., and U.S. Pat. No. 2,812,670 issued Nov. 12, 1957 to M. P. Winther both disclose a single stage hydraulic transmission where a viscous fluid transfers power between two vanes. These two patents disclose the early stages of a torque converter where rotational speed of the motor created connected the engine to the drive wheels. While these transmissions disclose power transmission they are limited to only a single turbo transmission speed with a multi-speed gearbox.

U.S. Pat. No. 2,671,543 issued Mar. 9, 1964 to J. Bosch discloses a fluid transmission system. The fluid transmission system uses two opposing turbines separated by a gap. Both the engine speed and the gap distance are variable to provide some additional speed variation between the motor and the driven wheels. While this patent discloses a more variable speed system the transmission has only one gear and is therefore limited in the range of speed control.

U.S. Pat. No. 4,100,823 issued Jul. 18, 1978 discloses an automatic transmission having a hydrodynamic torque converter between the input shaft and the gear system. The torque converter can be disengaged from the gear system to allow for changing of the gear ratio before re-engaging the torque converter. While this patent uses a hydrodynamic torque converter, gears are still used to change the ratio turning ration of the input to output shaft.

U.S. Pat. No. 4,624,110 issued Nov. 25, 1986 to Harry H. Levites discloses a fluid powered turbine using multiple turbines. The multiple turbines are configured in a tapers housing where the velocity of the fluid within the housing is increased as the fluid passes though a smaller cross sectional area thereby increasing the rotating speed of each turbine placed further down the tapered housing. While this patent describes the use of multiple turbine blades it operates as a steam turbine to generate power from steam entering the system. The generation of the pressure to turn the turbines is created external to the system as opposed to between turbines What is needed is a multiple turbines that are individually controlled and connected with one-way clutches to the output shaft. The proposed application provides this solution in a simple single unit.

BRIEF SUMMARY OF THE INVENTION

It is an object of the turbo-transmission to operate without frictional disc clutched or gears that create heat that results in a loss of energy.

It is an object of the turbo-transmission to create a turbo-transmission that is simpler and has fewer components than a modern automatic transmission. Only one controller is used with a few solenoid valves where the solenoids control by the transmission module (TCM) and that the transmission acts as an automatic transmission. Manual shifting can be done by operating the solenoid valves manually to act as a manual transmission or by (TCM). It is simpler in operation and less expensive than modern automatic or manual transmissions.

It is another object of the turbo-transmission to eliminate a torque converter. The torque converter is not required in the turbo-transmission and therefore more energy is saved from efficiency loss and weight reductions.

It is another object of the turbo-transmission to be used in all vehicles from small vehicles to large vehicles by changing the surface are of the turbine blades and or the angle of the turbine blades and or by using two or more pumps inline for heavy equipment such as trucks, tractors or bulldozers It is still another object of the turbo-transmission to be used in other application such as pump drivers by using the motor as a power source where the turbo-transmission acts as a variable torque drive or variable speed drive for the pump and other applications.

Various objects, features, aspects, and advantages of the present invention will become more apparent from the following detailed description of preferred embodiments of the invention, along with the accompanying drawings in which like numerals represent like components.

BRIEF DESCRIPTION OF THE DRAWINGS

FIG. 1 shows a block diagram of the Turbo-Transmission connected between an engine and a vehicle.

FIG. 2 shows a block diagram of the Turbo-Transmission connected between a motor and a pump.

FIG. 4A-4D shows a three speed Turbo-Transmission and the fluid flow through each of the three speeds.

DETAILED DESCRIPTION

Figure 3:
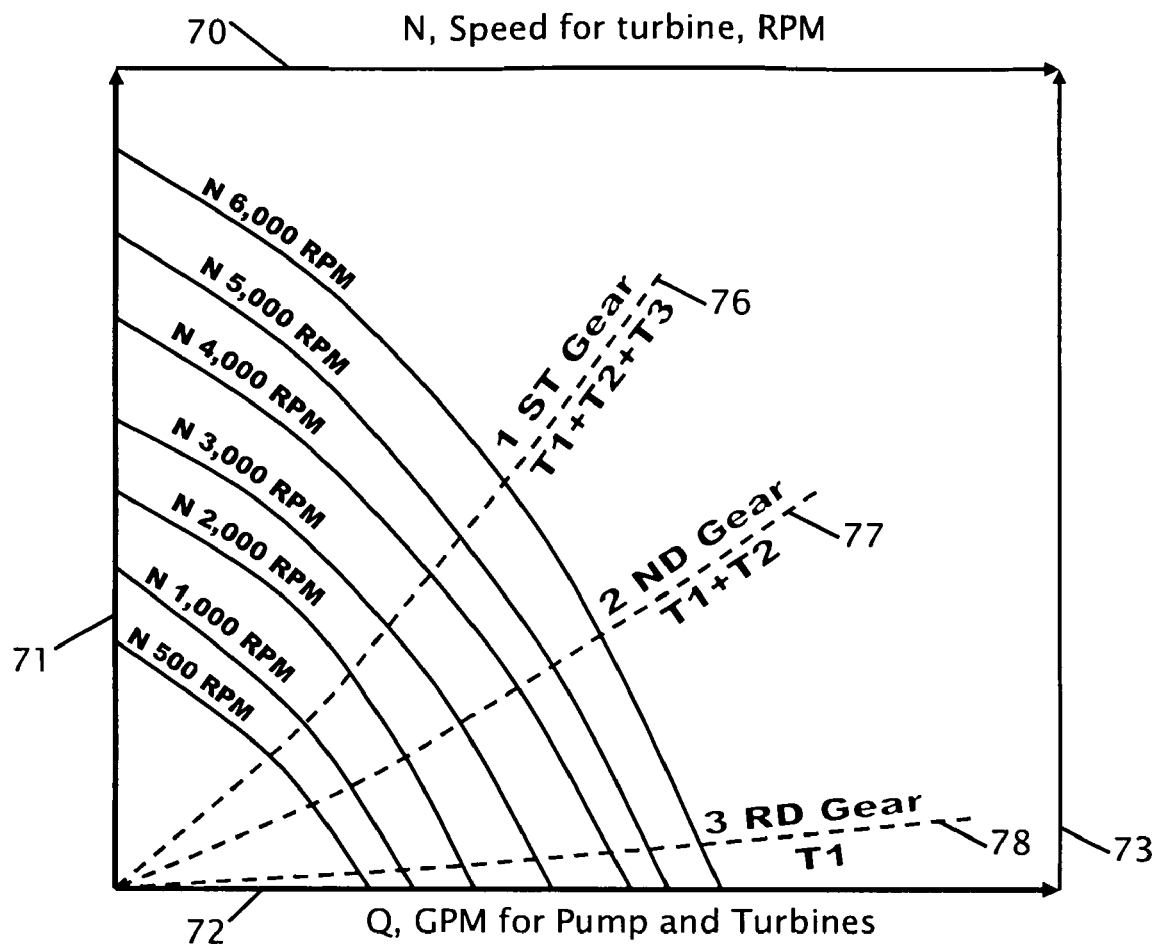
FIG. 3. Shows a system curve for a three speed Turbo-Transmission.

FIG. 1 shows a block diagram of the Turbo-Transmission connected between an engine and a vehicle. From this block diagram a power source 20 such as an engine or motor is connected to the Turbo-Transmission 30. Within the transmission is a pump 40, fluid coupled to turbines 50 and then coupled to a gear set 60. The Turbo-Transmission 30 is then connected to a work unit 21 such as a vehicle.

FIG. 2 shows a block diagram of the Turbo-Transmission connected between a motor and a pump. From this block diagram a power source 20 such as an engine or motor is connected to the Turbo-Transmission 30. Within the transmission is a pump 40 fluid coupled to turbines 50. The Turbo-Transmission 30 is then connected to a work unit 22 such as a pump or other uses.

FIG. 3. Shows a system power curve for the Turbo-Transmission. The left vertical axis 71 is head in ft for a pump. The right vertical axis 73 is Torque in lb-ft for turbines on an output shaft. The upper horizontal axis 70 is N for the speed for a turbine in Revolutions per Minute (RPM). The bottom horizontal axis 72 is Q for Gallons per Minute (GPM) for a pump or turbine. Solid curved lines 74 represent system curves for a pump at different N, RPM(s). Dashed curved lines 75 represent system curves for turbines. From these curves the $1^{st}$ Gear curve 76 shows the first gear, Turbine1 (T1)+Turbine 2 (T2)+Turbine 3 (T3) in operation. The curve of $2^{nd}$ Gear 77 shows the second gear, Turbine 1+Turbine 2 in operation. The curve of $3^{rd}$ Gear 78 shows the third gear, Turbine 1 in operation. The turbines and gears are described in more detail with FIGS. 4a-4d.

FIG. 4A-4D shows a three speed Turbo-Transmission and the fluid flow through turbines. The chart shown in FIG. 4D identifies the activation of the three solenoids to allow flow through the three turbines. The solenoids are designated as ON or OFF and their activation or de-activation allows or prevents flow from the pump 40 through the turbines 51-53. When any solenoid valve is on (closed) no flow will exist to the solenoid valve and the valve is OFF (open) flow will be allowed to pass though the valve. FIG. 4A represents a third gear where solenoid 1 is OFF and 2 and 3 are ON. Input shaft 26 turns pump 40 that supplies output flow 25 through turbine (T1) 51. Because solenoids 2 and 3 are ON no flow is made through turbines (T2) 52 or (T3) 53. Roller clutches in these turbines allow the turbine to free spin on the output shaft 90. FIG. 4D represents second gear where solenoid 2 is OFF and solenoids 1 and 3 are ON. Input shaft 26 turns pump 40 that supplies output flow 25 through turbine (T1) 51 and turbine (T)2 52. Because solenoid 2 is OFF no flow is made through turbine or (T3) 53. Roller clutch in this turbine allow the turbine to free spin on the output shaft 90. FIG. 4C represents first gear where solenoid 3 is OFF and solenoids 1 and 2 are ON. Input shaft 26 turns pump 40 that supplies output flow 25 through turbines (T1) 51, (T2) 52 and (T3) 53 that turn the output shaft 90. Return flow 24 goes from the turbines back to the pump 40.

Figure 5:
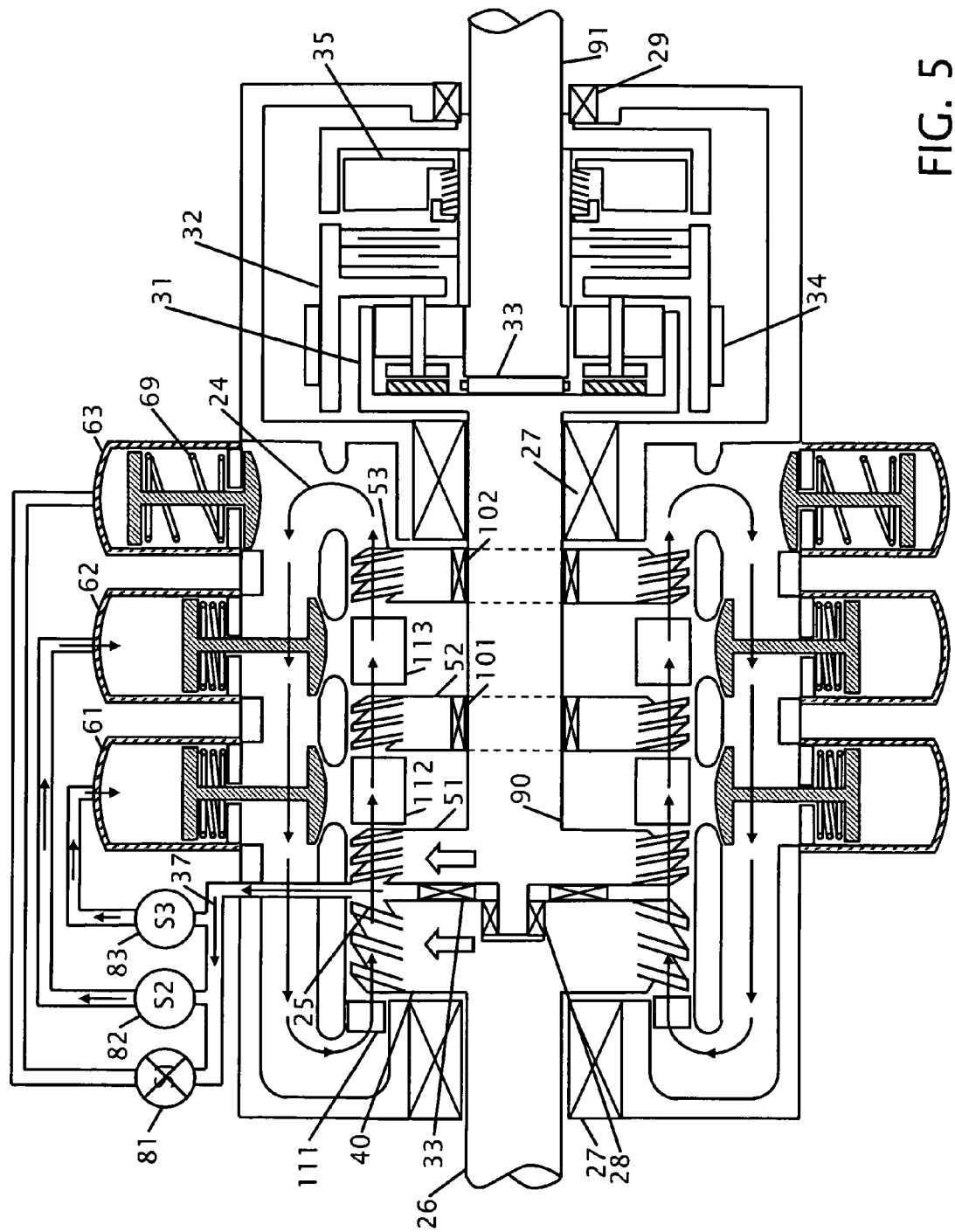
FIG. 5 shows a side cross sectional view of a three speed Turbo-Transmission.
Figure 8:
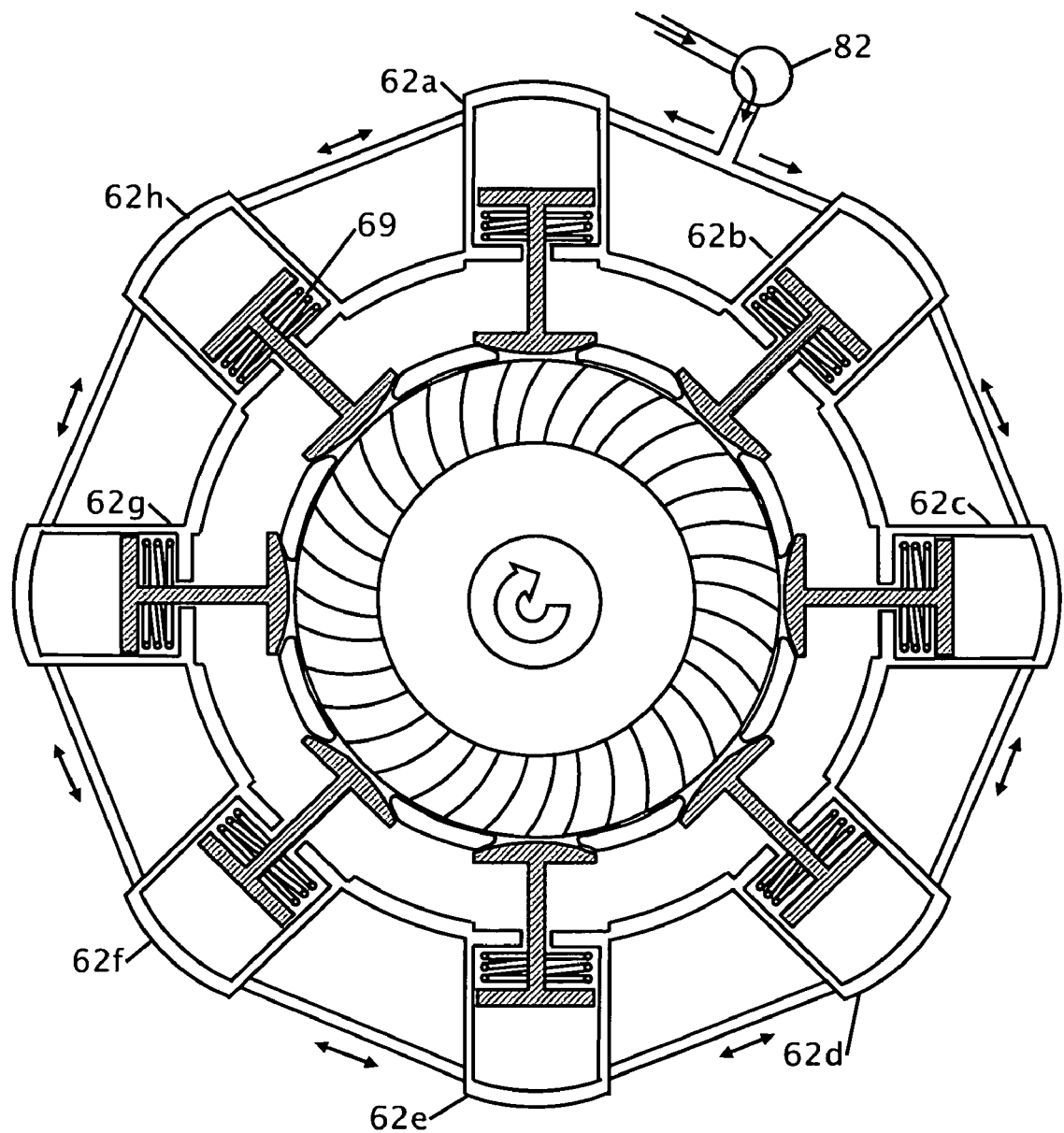
FIG. 8 shows a front cross sectional view of one turbine of a Turbo-Transmission with the valves closed.
Figure 9:
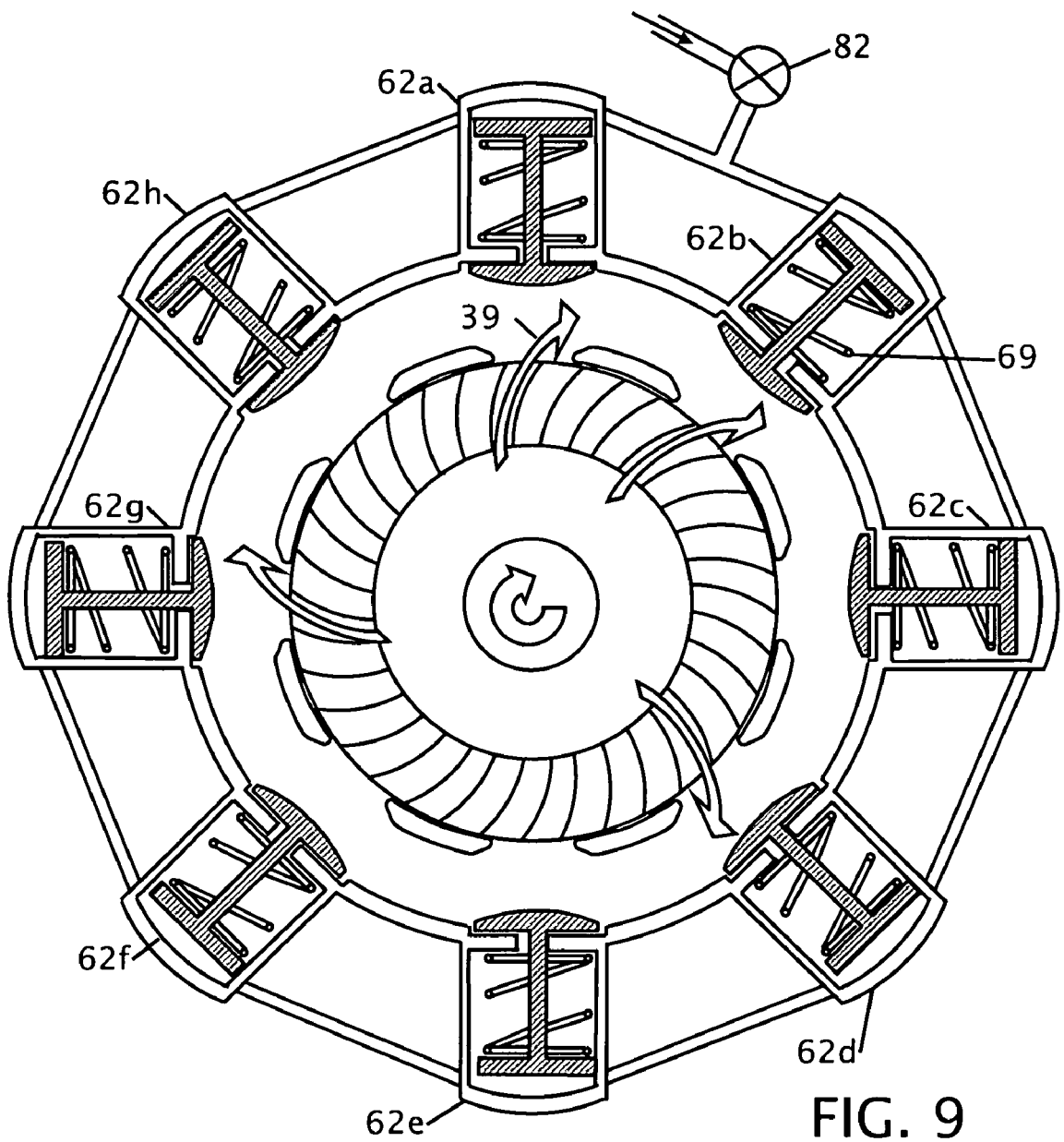
FIG. 9 shows a front cross sectional view of one turbine of a Turbo-Transmission with the valves open.

FIG. 5 shows a side cross sectional view of a three speed Turbo-Transmission. The turbo-transmission is essentially round and components shown on the top of this figure are also shown on the bottom of this figure. A brief look at FIGS. 8 and 9 show a cross section view of a set of three valves around the turbo-transmission and each of the three sets has eight valves it is contemplated that more or less than eight valves can be used. Rotational bearings 27, 28 and 29 support the various input 26 and output 90 shafts as the power is transmitted to the input shaft 26 through the pump turbo-transmission to the output shafts 90 and 91. One or more trust bearings 33 maintain the turbines in position from the thrust being exerted on them. In operation input shaft 26 is turned by a motor or the like. When input shaft 26 is turned it will turn pump 40. A portion of the flow 37 will be used to operate solenoids 81-83 that control valves 61-63 that allow one or more of the turbines 51-53 to turn. Valves 61-63 are maintained in the open position with spring(s) 69.

The output flow 25 from pump 40 will push against first turbine 51 and will turn the turbine on. Output flow from turbine 51 will push through the nozzle 112 to redirect flow to turbine 52 and will turn the turbine on. The flow then goes through nozzle 113 to redirect the flow to another turbine 53 and turn the turbine on and then the flow 24 will return back to the pump through nozzle 111. The pressure after the pump 40 will be larger than the pressure at the nozzle 112. The pressure through each successive turbine will drop gradually as the fluid flows though each turbine. Specifically the pressure at nozzle 112 will be greater than the pressure at nozzle 113 and the pressure at nozzle 113 will be larger than the pressure after turbine 53.

In this figure flow 37 is shown passing through only valves 82 and 83 because valve 81 is closed. Flow through the solenoids 82 and 83 then flows into valves 61 and 62 that block flow from returning 24 back to the pump. The output flow will push through nozzles 112 and 113 to turn their respective turbines. Turbines 52 and 53 are connected to the shaft with one-way clutches 101 and 102 the turn the shaft and also allow the turbines 52 and 53 to free spin on the shaft when flow, or insufficient flow, is not running though the turbines. A planetary gear set is located after the turbo-transmission on the output shaft that is connected to ring gear 31, carrier 32 and sun gear or output shaft 91 and will be located forward of clutch 35 and reverse brake 34 and parking gear and the speed sensor.

Figure 6:
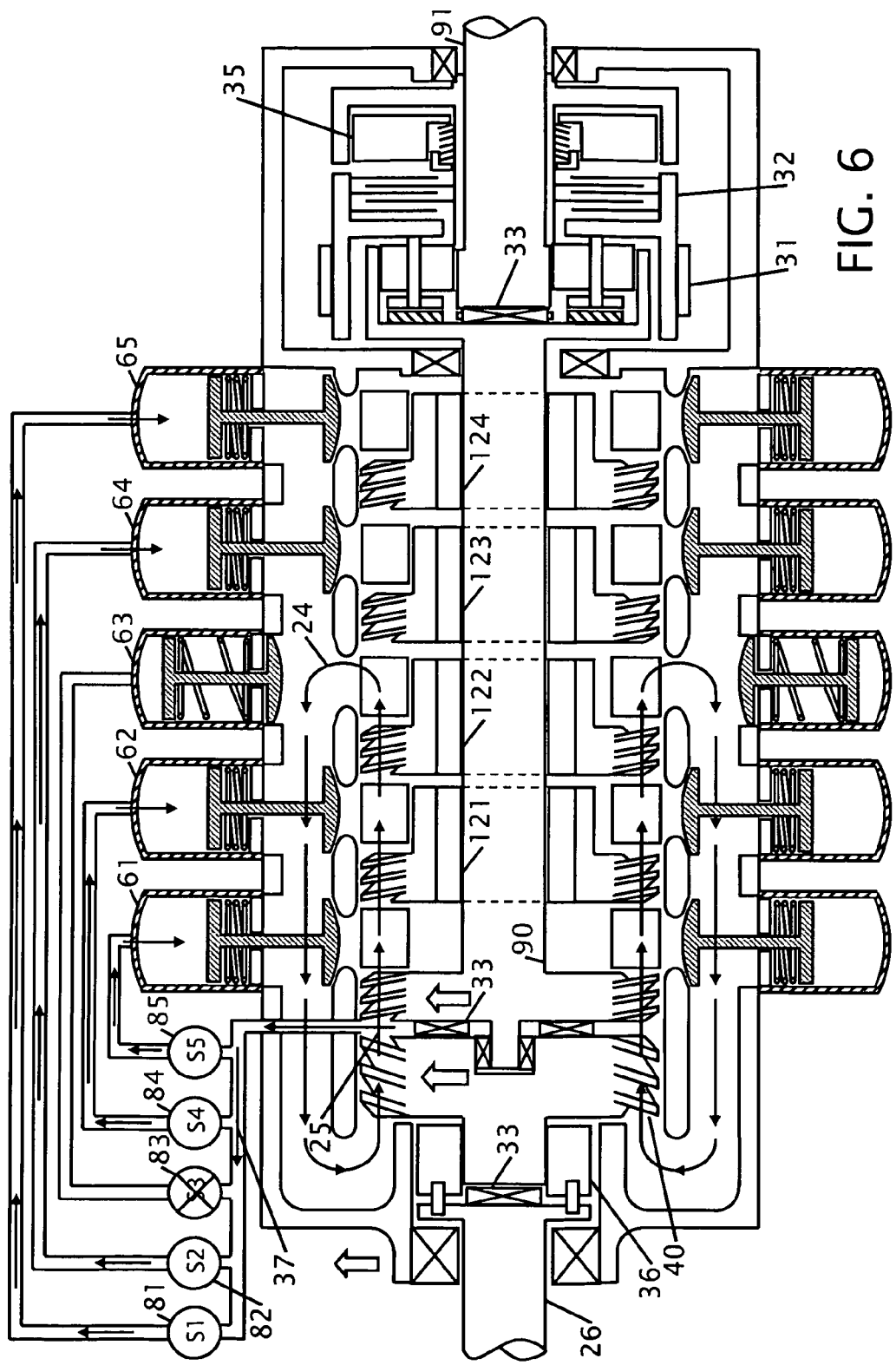
FIG. 6 shows a side cross sectional view of a five speed Turbo-Transmission.

FIG. 6 shows a side cross sectional view of a five speed Turbo-Transmission. The transmission shown in this figure is similar to the transmission shown in FIG. 5. The major differences are that this turbo transmission has five turbines to simulate a five speed transmission and a permanent planetary gear set overdrive 36 exists between the input shaft 26 and the pump 40 turbines. Output flow 25 from the pump 40 is fed to the solenoids 81-85 and the turbines. In this figure solenoid 83 is off therefore the valve 63 is open. When this valve 63 is open return flow 24 will flow back to the pump 40. The remaining valves 61, 62, 64 and 65 will be closed and no flow will go through the opening to pump 40. In this figure the turbines are connected to the shaft 90 with one-way multiple disk clutches 121-124. Flow to and through a turbine will turn on the turbine and engage the clutch(s). When there in minimal or insufficient flow the turbine will free spin on the shaft. This is shown and described in more detail with FIG. 11. Note that some redundant item numbers from FIG. 5 are not identified with this figure.

Figure 7:
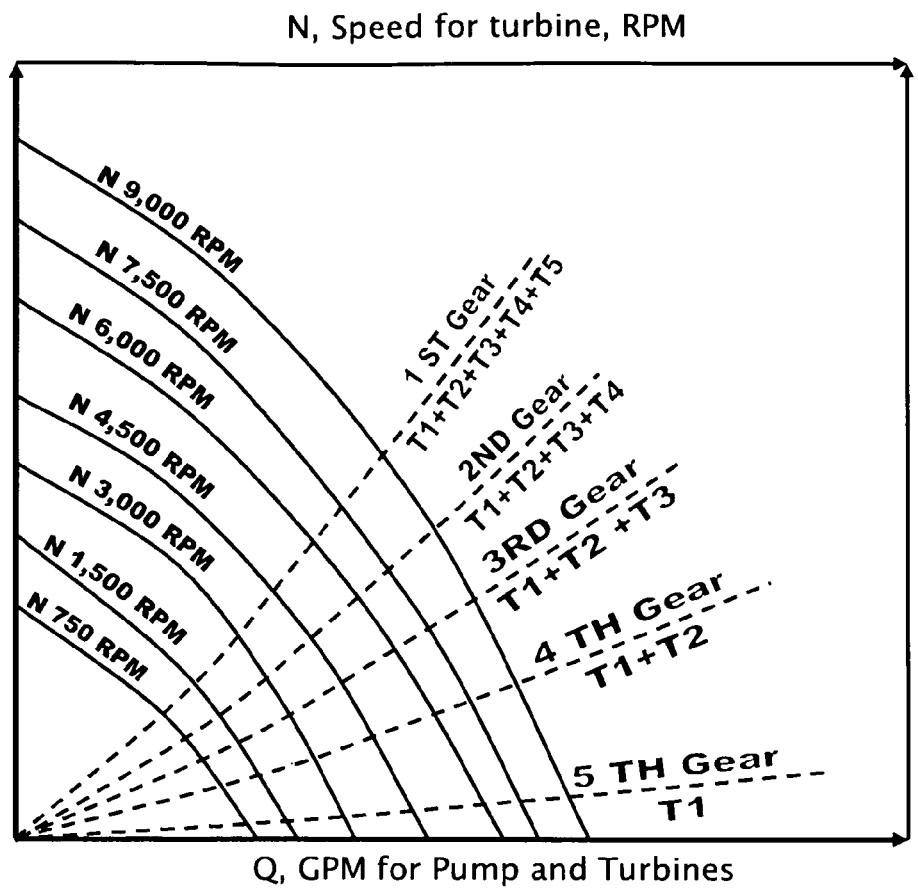
FIG. 7. Shows a system curve for a five speed Turbo-Transmission.

FIG. 7. Shows a system curve for a five speed turbo-transmission. The transmission shown in this figure is similar to the three speed transmission in shown and described in FIG. 3 except the speed of the pump 74 will be higher than the speed of the engine because of a permanent planetary overdrive that is located between the engine and the pump.

FIG. 8 shows a front cross sectional view of one turbine of a Turbo-Transmission with the valves closed. FIG. 9 shows a front cross sectional view of one turbine of a Turbo-Transmission with the valves open. While it is shown with eight valves 62a-62h existing around the turbo-transmission it is contemplated that more or less than eight valves can be used. In FIG. 8, the solenoid, 82 is open and flow enters all the valves 62a-62h, whereby pushing the valves closed. In this orientation flow will be blocked from exiting the opening after turbine 52 (not shown). In FIG. 9, the solenoid, 82 is closed and flow is blocked from all the valves 62a-62h, whereby allowing flow 39 through the opening after turbine 52 (not shown). Note that the spring(s) 69 maintains the valve(s) open in FIG. 9.

Figure 10:
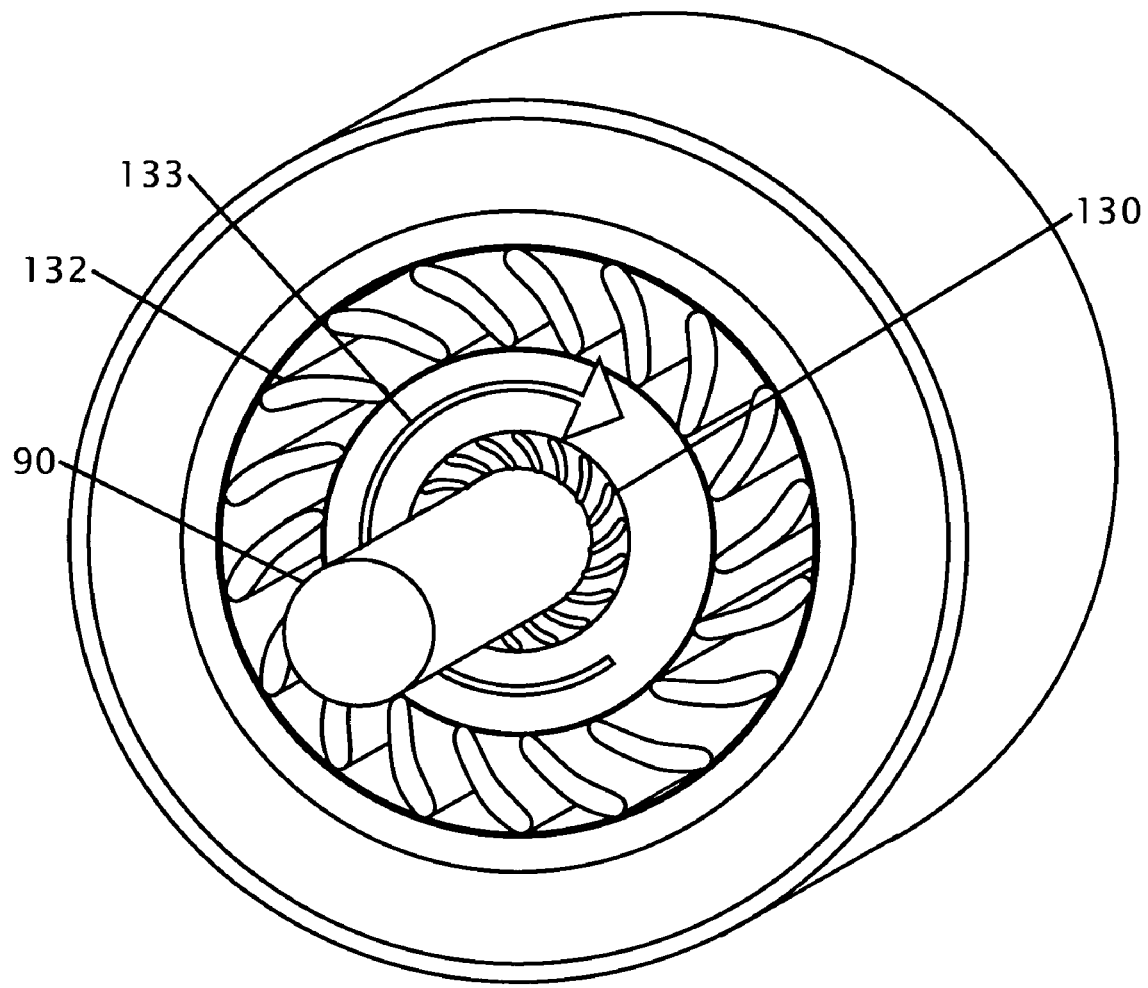
FIG. 10 shows a partial isometric view of one-way overrunning clutches or roller clutches that connect the speed turbines to the driven shaft.

FIG. 10 shows a partial isometric view of one-way overrunning clutches or roller clutches that connect the speed turbines to the driven shaft. This figure shows one contemplated embodiment of a one way clutch using a plurality or dogs or sprags 130 connected around a shaft 90. When the turbine 132 turns in one direction the dogs or sprags 130 grip onto the shaft 90 to turn the shaft. When the turbine 132 stops or turns 133 in the opposite direction, the dogs or sprags release the shaft and allows the turbine to free spin on the shaft 90. While dogs or sprags are shown and described a number of other one-way clutches or bearing are contemplated that perform equivalently.

Figure 11:
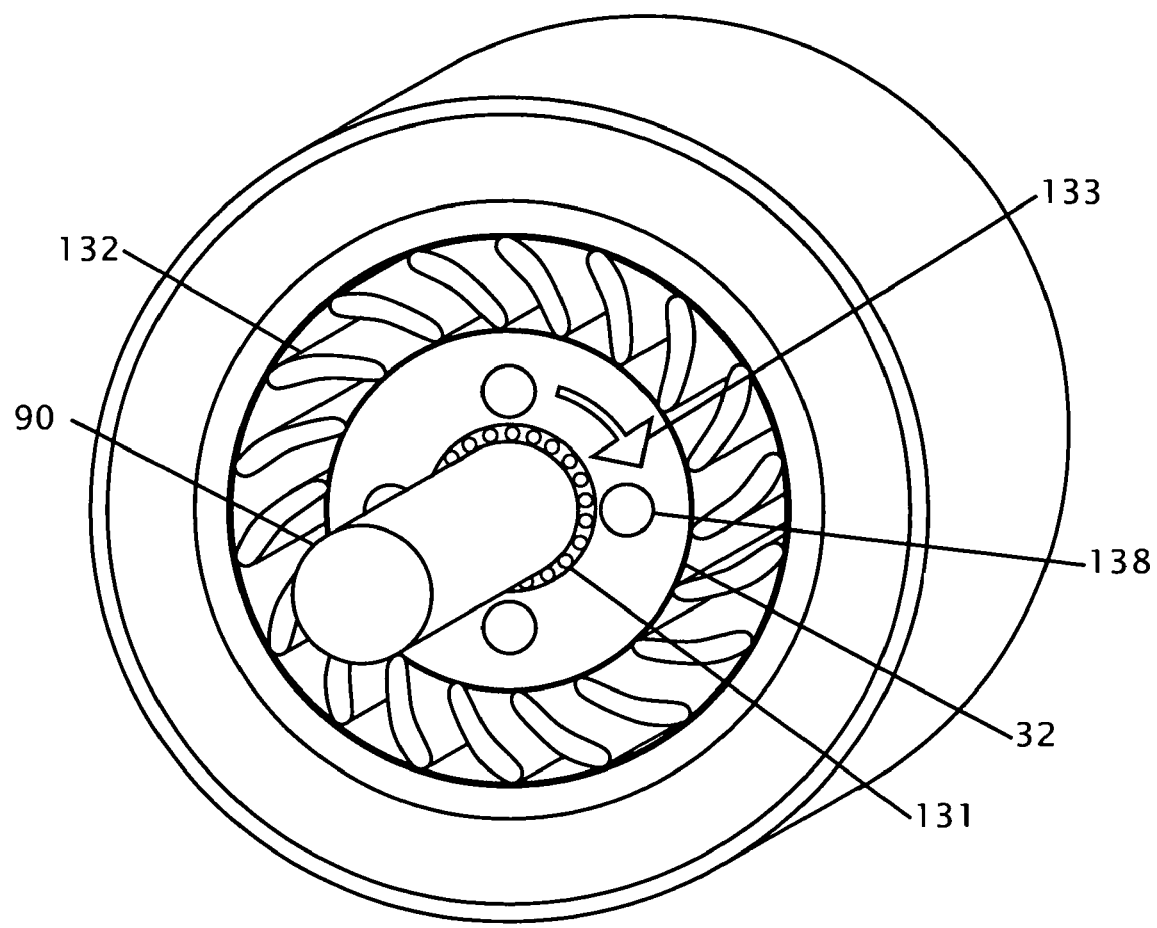
FIG. 11 shows a partial isometric view of a multiple disc clutch that connects the speed turbines to the driven shaft.
Figure 12:
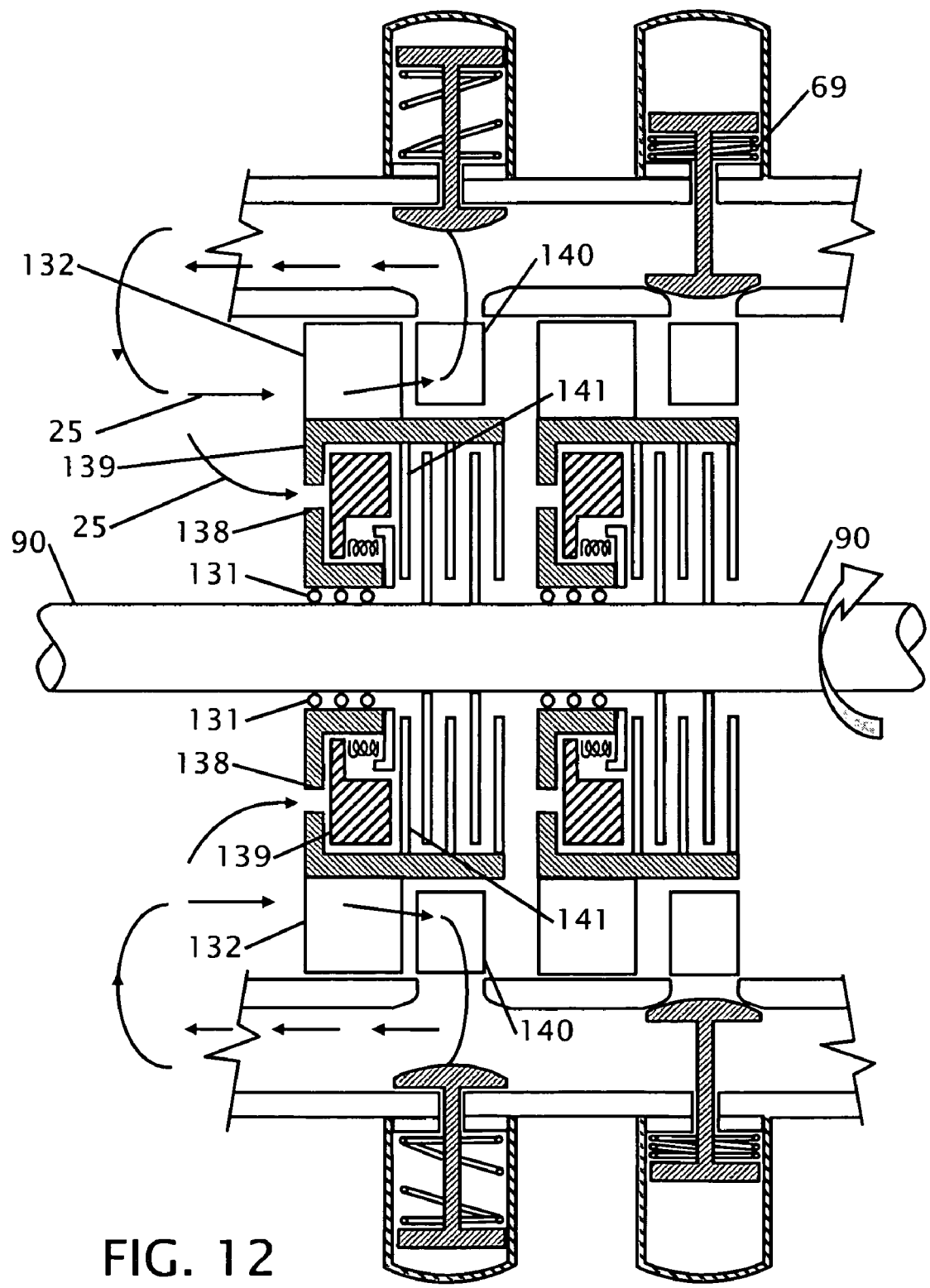
FIG. 12 shows a side cross sectionals view of a multiple-disk clutch used in the Turbo-Transmission.

FIG. 11 shows a partial isometric view of a multiple disc clutch that connects the speed turbines to the driven shaft. FIG. 12 shows a side cross-sectionals view of a multiple-disk clutch used in the Turbo-Transmission. FIG. 11 shows a shaft 90 connected to a multi-disc clutch plate 32 through bearing 131. The multi-disc clutch pack 32 is shown with more detail in FIG. 12. This configuration uses the pressure of the output flow 25, which comes from the pump, to go through opening 138 to push piston 139 and lock the disk clutch 141. The moving clutch plate has the turbine blades 132 that provides the rotational motion 133 on the output shaft 90. In addition to the output flow 25 entering the opening 138 flow will also move through the nozzle(s) 140.

FIG. 12 shows a partial cross-sectional view of the turbine with a multiple-disc clutch connected to output shaft 90 with bearing 131. When the differential pressure before or after the turbine is sufficient to turn the turbine and lock the multi-disc clutch then the power will transfer to output shaft 90. The pressure 25 will turn the turbine 132 and push through opening 138 where it will push piston 139 against the disk clutch 141 and lock the turbine to output shaft 90.

Thus, specific embodiments of a hydrodynamic turbo-transmission have been disclosed. It should be apparent, however, to those skilled in the art that many more modifications besides those described are possible without departing from the inventive concepts herein. The inventive subject matter, therefore, is not to be restricted except in the spirit of the appended claims.

What is claim is:

1. A transmission apparatus configured to transmit energy from a power source to work unite the transmission apparatus comprising:
   an outer housing defining an interior region containing a fluid;
   an input shaft being coupled to a power source to receive energy there from;
   said input shaft being couple to a pump to transfer energy from said power source into the fluid and then to a multi-stage turbine;
   a first turbine positioned in front of said pump and is fixed to an output shaft;
   at least a second turbine located in series after said first turbine rotationally secured to said output shaft with a one-way overrunning clutch or multiple-disc clutch;
   a plurality of valves located after each turbine that are opened to discharge fluid or gas after each turbine or closed to allow flow to said second or subsequent turbine(s) wherein;
   said one-way overrunning clutch or said multiple-disc clutch will be locked in the same direction of said first turbine and will be free to rotate in an opposing direction without appreciable drag on said output shaft, and
   said turbines will transfer power when the differential pressure before and after said turbines is sufficient to turn said turbines and lock said one-way overrunning clutch or multi-disc clutch and to transfer power to said output shaft.

2. The transmission apparatus according to claim 1 wherein said plurality of valves are opened or closed under control of corresponding solenoids to change a drive ratio between the input and output shaft.

3. The transmission apparatus according to claim 2 wherein a nozzle is located between said first and second turbines to redirect the fluid or gas to said second turbine or to any open valves.

4. The transmission apparatus according to claim 2 wherein all said turbines before said open valves will be in driven rotation and any turbine after the last open set of said valves will be in free rotation on said output shaft because no fluid is flowing through any remaining turbine.

5. The transmission apparatus according to claim 2 wherein all of said solenoids are operable manually to act as a manual transmission or by a transmission control module that acts as an automatic transmission.

6. The transmission apparatus according to claim 2 wherein all said valves operate by pressurized fluid that is created by said pump through said solenoid.

7. The transmission apparatus according to claim 1 wherein each said turbine has a different blade size and or angle to create a different gear ratio.

8. The transmission apparatus according to claim 1 that further includes a planetary gear set, sun gear, carrier, ring gear that provides reverse, neutral, and forward operations.

9. The transmission apparatus according to claim 1 wherein said transmission uses two separate controllers where one controller controls the turbine operation and a second controller controls the vehicle operation for reverse, neutral and forward.

10. The transmission apparatus according to claim 1 wherein the number of turbines in said transmission will correspond to the number of gears in the transmission.

11. The transmission apparatus according to claim 10 wherein the number of turbines is five and there are five of said valves, each having a solenoid.

12. The transmission apparatus according to claim 11 wherein operation of said first turbine corresponds to a fifth gear or overdrive gear.

13. The transmission apparatus according to claim 11 wherein operation of said first and second turbine corresponds to a fourth gear.

14. The transmission apparatus according to claim 11 wherein operation of said first and second turbines, and a third turbine corresponds to a third gear.

15. The transmission apparatus according to claim 11 wherein operation of said first and second turbines, and a third and fourth turbine corresponds to a second gear.

16. The transmission apparatus according to claim 11 wherein operation of said first and second turbines, and a third, fourth and fifth turbine corresponds to a first gear.

17. The transmission apparatus according to claim 1 wherein said one-way clutch or said multiple disc clutch is said one-way overrunning clutch whereby said second turbine transfers power when differential pressure before and after said second turbine is sufficient to run said one-way overrunning clutch into engagement with said output shaft.

18. The transmission apparatus according to claim 1 wherein said one-way clutch or said multiple disc clutch is said multi-disc clutch whereby said second turbine transfers power when differential pressure before and after said second turbine is sufficient to run said multi-disc clutch into engagement with said output shaft.

* * * * *